Patented July 1, 1941

2,247,353

UNITED STATES PATENT OFFICE 2,247,353

METHOD OF SIZING TEXTILES

László Auer, Taunton, Mass.

No Drawing. Application September 2, 1937, Serial No. 162,161. In Hungary September 4, 1936

5 Claims. (Cl. 91—70)

This invention relates to a sizing material and sizing textiles.

Textiles, such as yarns and fabrics of rayon, cotton, linen, spun rayon, jute, and to some extent wool, are not satisfactorily crushresistant. For crushproofing (creaseproofing) textiles many processes are known which apply synthetic resins obtained by condensation of urea and formaldehyde and phenol and formaldehyde. Because of the dark color of phenol formaldehyde condensation products, the urea formaldehyde synthetic resins have more pronounced commercial importance.

Mixtures of solutions of urea and formaldehyde or solutions of water-soluble condensation products of urea and formaldehyde are not stable, especially in cases when condensation catalysts, such as tartaric acid, acetic acid, are present too. For this reason their application is not very convenient and the impregnation with such solutions does not yield uniform products as the forming of precipitates or the change in resinification degree alters the constitution of the liquid.

The present invention yields stable sizing solutions which do not change their constitution appreciably upon longer storage and do not form precipitates in the storage tanks. According to the present invention such valuable sizing solutions may be obtained when cyanamid solution and formaldehyde solution are mixed together. The cyanamid may be partly or fully replaced by dicyandiamid and the formaldehyde by compounds being water soluble and having reacting methylene or aldehyde groups in their molecule. Condensing agents may be present in the solution.

One of the starting materials of the present invention is calcium cyanamid. This is treated in a mixer with water, filtered and the resulting calcium acid cyanamid solution treated with carbon dioxide gas, until all calcium is precipitated. The filtrate contains cyanamid solution, which may be repeatedly applied to dissolve fresh calcium cyanamid, instead of water. A counterstream principle may be applied, to obtain finally highly concentrated cyanamid solutions. There are apparatus known in the patent literature which permit to simultaneously dissolve the calcium cyanamid, to precipitate the calcium carbonate and to filter the mixture to obtain concentrated cyanamid solutions.

The temperature at which the process is carried out regulates the dicyandiamid content of the cyanamid solution. If the process of making the cyanimid solution is carried out at 30° C. or below, practically no dicyandiamid is formed, whereas at higher temperatures the cyanamid is converted partly or fully into dicyandiamid. By regulating the temperature we may vary the constitution of the solution. Further below in this specification, under cyanamid solutions, the above solution is meant which may consist entirely of cyanamid or partly or fully of diciandiamid. For the present invention any variation of the above solution may be applied.

As an example to 75 parts of calcium cyanamid 200 parts of water may be added and the resulting cyanamid solution may be applied 3 more times for treating fresh calcium cyanamid to increase concentration on cyanamid. The final calcium free cyanamid solution may contain 6 to 7% cyanamid in solution. The resulting cyanamid solution may be applied with formaldehyde either in a two bath or in a one bath process for sizing textiles.

In case of the two bath process the treatment with the cyanamid solution and the treatment with the formaldehyde solution occur in two successive steps, whereas in case of the one bath process the formaldehyde may be mixed with the cyanamid solution and the mixed single solution applied for impregnation purposes. For the purposes of simplicity the one bath process is generally preferred.

Condensing agents (condensation catalysts), such as tartartic acid, oxalic acid, acetic acid, formic acid, benzoic acid, phthalic acid, may be added to the sizing solution. The addition of hexamethylene tetramine accelerates condensation to a great extent but it is advisable to add this compound shortly before the sizing solution is applied.

The sizing solution is stable also in presence of the acid catalysts. Benzoic and phthalic acids improve laundryproofness of the sizing.

Fillers, dyes, pigments, plasticizers, such as fatty alcohol sulfonates, (sodium cetyl alcohol sulfonate) may be added to the sizing solution. The addition of wetting out agents is advantageous.

Instead of formaldehyde we may apply compounds which are water soluble and have free reactive methylene or aldehyde groups in their molecule or form such reactive methylene or aldehyde groups in situ. Acetaldehyde is an example for such compounds.

The impregnated textiles (yarns or fabrics) are dried in a loose condition or under tension on the tenter frame and heated to temperatures above 100° C. to complete condensation. At 140° C. 3–5 minutes are satisfactory. But the condensation may be completed also at a lower temperature and even at room temperature after longer storage. The complete condensation is important to obtain permanent sizing effects and to secure satisfactory laundryproof qualities.

The following examples show how the sizing solutions may be formulated, but the scope of the invention is not limited to these examples.

*Example 1*

| | Parts by weight |
|---|---|
| Concentrated cyanamid solution | 52 |
| Formaldehyde 40% | 28 |
| Conc. acetic acid | 5 |
| Tartaric acid | 5 |

*Example 2*

| | Parts by weight |
|---|---|
| Conc. cyanamid solution | 50 |
| Formaldehyde 40% | 12 |
| Oxalic acid | 3 |
| Formic acid | 3 |
| Hexamethylenetetramine | 1 |
| Sodium cetylalcohol sulfonate | 3 |

*Example 3*

| | Parts by weight |
|---|---|
| Conc. cyanamid solution | 20 |
| Formaldehyde 40% | 5 |
| Tartaric acid | 1 |
| Hexamethylenetetramine | 1 |
| Water | 30 |

The above sizing solution may also be applied in two bath processes when the hexamethylene tetramine may be added to the cyanamid solution and the acid catalysts to the formaldehyde.

To the above sizing solutions dyes, fillers and other sizing solutions may be added, which are used in sizing textiles, without detrimental effect to the present process.

In case of benzoic and phthalic acid it may be advantageous to preimpregnate the yarns and fabrics with the acid at temperatures near to the boiling point of the solution, to dry the goods after preimpregnation and to apply the cyanamid formaldehyde sizing to the preimpregnated goods in the usual manner. Hexamethylene tetramine may be added to the sizing liquid.

What I claim is:

1. As an improved method of sizing textiles to render the same crush-proof and crease-proof the process which comprises impregnating the textile material with an aqueous solution of cyanamid, prepared of a concentrated cyanamid solution, having a concentration of 6 to 7 per cent of cyanamid, and a formaldehyde solution of 40 per cent strength, in proportions of parts by weight of 1.86 to 4.16 parts of concentrated cyanamid solution to 1 part of formaldehyde solution, drying the impregnated material and resinifying the cyanamid in situ by the aid of heat, in and on the fibers of the textile material.

2. The process of claim 1 wherein as catalyst an organic acid is used.

3. The process of claim 1 wherein as catalyst an organic acid is used and in addition to the organic acid catalyst hexamethylenetetramine is added to the mixture.

4. The process of claim 1 wherein as catalyst benzoic acid is used, to improve the sizing on resistance to laundering and washing.

5. The process of claim 1 wherein as catalyst phthalic acid is used, to improve the resistance of the sizing to laundering and washing.

LÁSZLÓ AUER.